United States Patent [19]

Barnes et al.

[11] Patent Number: 5,234,761

[45] Date of Patent: Aug. 10, 1993

[54] PROTECTIVE BARRIERS

[75] Inventors: John A. Barnes; William J. Brennan; William N. E. Meredith; Florence H. G. Cowan, all of Cleveland, England

[73] Assignee: Imperial Chemical Industries, PLC, Hertfordshire, England

[21] Appl. No.: 559,953

[22] Filed: Jul. 31, 1990

[30] Foreign Application Priority Data

Jun. 20, 1990 [GB] United Kingdom ............... 9013702

[51] Int. Cl.5 .................... B32B 13/04; B64G 1/22
[52] U.S. Cl. .................... 428/336; 244/158 R; 428/446; 428/501; 428/502; 428/519; 428/521; 428/524
[58] Field of Search .............. 244/158 R; 428/446, 428/501, 502, 519, 521, 524, 336

[56] References Cited

U.S. PATENT DOCUMENTS

| | | | |
|---|---|---|---|
| 3,936,383 | 2/1976 | Daimon et al. | 252/63 |
| 4,174,358 | 11/1979 | Epstein | 525/183 |
| 4,425,465 | 1/1984 | Padget et al. | 524/450 |
| 4,543,287 | 9/1985 | Briggs et al. | 428/288 |
| 4,664,980 | 5/1987 | Sovey et al. | 428/421 |
| 4,800,041 | 1/1989 | Tymon et al. | 252/378 R |
| 4,980,206 | 12/1990 | Torre et al. | 427/385.5 |

OTHER PUBLICATIONS

Atomic Oxygen: Achilles Heel of Man in Space, Materials Engineering Aug. 1987 (pp. 39–41).
"Clay Minerals: Their Structure, Behavioral and Use" Proceedings of a Royal Society Discussion Meeting, 9 and 10 Nov. 1983.

Primary Examiner—Edith Buffalow
Assistant Examiner—D. S. Nakarani
Attorney, Agent, or Firm—Cushman, Darby & Cushman

[57] ABSTRACT

Barriers against atomic oxygen attack, e.g. on substrates such as parts of space vehicles in low earth orbit, consist of layer minerals, especially vermiculite and selected smectites.

29 Claims, No Drawings

PROTECTIVE BARRIERS

The invention relates to protective barriers and to components protected thereby.

The increasing activity of aerospace vehicles (which expression is intended to be generic to aircraft, spacecraft, space stations, satellites etc) in high altitude and low earth orbit has highlighted a significant material degradation/erosion problem. The main mechanism giving rise to such degradation/erosion of the materials used in aerospace vehicles has been identified as attach by atomic oxygen, e.g. see "Atomic Oxygen: Achilles' Heel of Man in Space", Materials Engineering, August 1987, 39–41. Although atomic oxygen species in low earth orbit are of relatively low energy, the relative velocity of the aerospace vehicle, typically 8 $kms^{-1}$, imparts sufficient energy to the atomic oxygen species/vehicle collisions to create significant interaction leading to the degradation/erosion of the materials used in the vehicle. It is recognised the significance of this problem will increase with the trend towards using lighter constructional materials such as thermoset and thermoplastic materials, which are more prone to such degradation/erosion, in such vehicles.

As discussed in the aforementioned article, various materials have been assessed in laboratory conditions as barriers to atomic oxygen attack. Promising candidates include silicone coatings, sputter deposited $Al_2O_3$ $SiO_2$/fluoropolymer mixes, siloxanes, silicon nitride, sputter-deposited aluminium and aluminium foil wrap. Other candidates include epoxy-silicone compounds, e.g. U.S. Pat. No. 4,874,643. Such coatings suffer from some disadvantages such as damage to or joints in the foil, adhesion to the substrate, costs of sputtering for large structures, defects in sputtered coating etc.

It is an object of the present invention to provide alternative materials which afford surprising and significant protective barrier properties against atomic oxygen attack.

Thus, the present invention relates to, and is concerned with, the use of layer minerals which exhibit barrier properties against atomic oxygen.

According to one aspect of the present invention, a protective barrier against atomic oxygen attack comprises a substantially continuous layer of lamellae of a film-forming, 2:1 phyllosilicate layer mineral which exhibit barrier properties against atomic oxygen.

According to another aspect of the present invention, a substrate susceptible to attack by atomic oxygen has, on surfaces thereof exposed in use to an atomic oxygen environment, a substantially continuous layer of lamellae of a film-forming, 2:1 phyllosilicate layer mineral which exhibit barrier properties against atomic oxygen.

According to a further aspect of the present invention, a method of protecting a substrate susceptible to attack by atomic oxygen comprising applying to surfaces thereof which will be exposed in use to an atomic oxygen environment a substantially continuous layer of lamellae of a film-forming, 2:1 phyllosilicate layer mineral which exhibit barrier properties against atomic oxygen.

According to a further aspect of the present invention, an article of manufacture protected from damage by an atomic oxygen environment comprises a substrate susceptible to attack by atomic oxygen and a protective barrier comprising a substantially continuous layer of lamellae of a film-forming, 2:1 phyllosilicate layer mineral which exhibit barrier properties against atomic oxygen.

According to yet another aspect of the present invention, an aerospace vehicle comprises external surfaces susceptible to atomic oxygen attack which have a protective barrier against such attack, said barrier comprising a substantially continuous layer of lamellae of a film-forming, 2:1 phyllosilicate layer mineral which exhibit barrier properties against atomic oxygen.

According to yet another aspect thereof, the invention is directed to the use as a protective barrier against atomic oxygen attack of lamellae of a film-forming, 2:1 phyllosilicate layer mineral which exhibit barrier properties against atomic oxygen.

The term "lamellae" as used in this specification means tiny particles of the layer mineral obtained by subjecting the mineral to a chemical delaminating process to form an aqueous colloidal dispersion of high aspect ratio particles or platelets of the mineral from which a film can be formed. Typically, the lamellae have a thickness of less than 0.5 $\mu$m, usually less than 0.05 $\mu$m and preferably of the order of or less than 0.005 $\mu$m and an aspect ratio (i.e. length or breadth divided by thickness) of at least 10, preferably at least 100 and up to 1000 or more, e.g. 10,000.

Preferably, the layer mineral is selected from the group consisting of smectites, preferably hectorite and montmorillonite, and vermiculite.

The term "vermiculite" as used in this specification means all materials known mineralogically and commercially as vermiculite including chlorite-vermiculites.

For information on the composition and structure of phyllosilicate layer minerals, reference can be made to "Clay Minerals: Their Structure, Behaviour & Use", Proceedings of a Royal Society Discussion Meeting, Nov. 9 and 10, 1983, London, The Royal Society, 1984 (particularly pages 222-223, 232-235).

Although the barrier can comprise a substantially continuous layer of lamellae of any practical thickness, barriers having surprising and significant protective barrier properties against atomic oxygen comprise a substantially continuous layer of lamellae at very low thicknesses, e.g. as low as 0.025 $\mu$m, but preferably the minimum thickness of the layer is at least 0.1 $\mu$m, preferably at least 0.3 $\mu$m, and particularly up to 1 $\mu$m.

In one preferred form of the invention, the layer mineral is vermiculite.

The barrier preferably comprises, particularly when the layer mineral is vermiculite, at least one component selected from a binder and a polymeric anchor coating interposable between the lamellae and the substrate or surface.

Preferably, the binder is an organic binder and may be any film-forming polymeric or oligomeric species or precursor therefor that assists in forming a film of the lamellae of the layer mineral and does not disrupt the film-forming capability thereof.

Preferably, the polymeric binder is selected from functionalised polyolefins, especially maleinised polybutadiene, and a liquid formaldehyde resin such as urea formaldehyde, melamine formaldehyde, phenol formaldehyde, resorcinol formaldehyde, cresol formaldehyde or mixtures thereof, especially melamine formaldehyde. Preferably, the binder, when present, comprises at least 5% by weight of the layer and, more particularly, between 10% and 50%, and especially between 15% and 35%, by weight of the layer.

Preferably, the polymeric anchor coating comprises a styrene/acrylamide copolymer of the type more particularly described in GB-A-1174328 and GB-A-1134876. Preferably, the anchor coating, when present, is less than 1 μm thick and, more particularly, is less than 0.5 μm, especially less than 0.25 μm, thick.

The protective barrier is formed by applying the lamellae as a slurry or dispersion and removing the dispersion medium to form a coherent layer. Preferably, the dispersion medium comprises water and the slurry or dispersion comprises between 0.5% and 20%, more especially between 1% and 10%, by weight of lamellae.

The substrate to which the protective barrier is applied in accordance with the invention is conveniently selected from structural parts of aerospace vehicles which have surfaces which are exposed to atomic oxygen environments in use or to components thereof exposed to those environments in use, the components being for example solar panels (the barriers being relatively flexible and transparent over a wide range of electromagnetic frequencies) and antennae. The substrate may also be a polymeric film. Typically, the polymeric film is selected from aromatic polyesters and aromatic polymers comprising divalent aromatic units containing divalent connecting groups selected from ketone, sulphone, sulphoxide or imide, the units being connected by ether and/or thioether linkages.

The invention will now be illustrated by reference to the following Examples.

EXAMPLE 1

A free-standing film of vermiculite lamellae was prepared by forming a wet film of lamellae of vermiculite slurry GP-903 available from W R Grace & Co and allowing the film to dry in air. The wet film was formed on a glass substrate using a 2% by weight aqueous slurry of the lamellae. The resultant film was 30 μm thick.

Samples of the film (approximately 16 cm$^2$) were subjected to a simulated atomic oxygen regime using a research plasma reactor available from Polar Materials Inc. USA, the samples being located on a 127 mm diameter powered aluminium electrode spaced 44.5 mm from a 114 mm cooper electrode. Parts of the samples were masked using a small silicon wafer on the surface of the sample to enable etch depths to be analysed using an α-step analyser available from Tencor, USA.

The plasma reactor was operated under the following conditions:-

O$_2$ flow rate = 100 standard cm$^3$ minute
pressure = 0.25 Torr
power = 100 watts
frequency = 125 kHz
etch time = 60 minutes.

Prior to treatment in the reactor, the sample was degassed by evacuating the reactor either down to about 0.01 Torr for 1 hour or overnight.

Although the vermiculite lamellae film samples exhibited a weight loss following removal from the reactor after treatment, allowing the samples to equilibriate in ambient atmosphere caused the sample weights to return to the untreated values. Furthermore, using the α-step analyser, no measurable step could be discerned on the material surface. Scanning electron micrographs of the untreated and treated samples showed no discernible differences.

Thus, the vermiculite lamellae film appeared to be unaffected by the simulated atomic oxygen environment to which it had been subjected.

EXAMPLE 2 (COMPARATIVE)

To demonstrate the effect of atomic oxygen on polymers, various polymer films were treated by the method described with reference to Example 1. The samples of polymer were:-

1 = a polyester film available under the trade mark MELINEX 'O' the Imperial Chemical Industries (ICI) Group;
2 = an amorphous polyetheretherketone film made from ICI's Victrex PEEK (trade name) and available from ICI under the trade name Stabar;
3 = a crystalline polyetheretherketone film made from ICI's Victrex PEEK (trade name) and available from ICI under the trade name Stabar; and
4 = a polyimide film available under the trade name Kapton from Du Pont.

The results are summarised in Table 1.

TABLE 1

| SAMPLE | DEGASSING TIME | WEIGHT LOSS AFTER DEGASSING μg/cm$^2$ | WEIGHT LOSS AFTER ETCHING μm/cm$^2$ | ETCH DEPTH FROM WEIGHT LOSS μm | ETCH DEPTH FROM α-STEP ANALYSER μm |
|---|---|---|---|---|---|
| 1 | 1 hour | 26.2 | 754 | 5.4 | 4.5 |
| 2 | overnight | 9.0 | 517 | 4.1 | 3.9 |
| 3 | overnight | 24.4 | 492 | 3.8 | 3.1 |
| 4 | 1 hour | 71.5 | 420 | 3.0 | 2.5 |

The discrepancy between the gravimetrically-determined etch depth and the step height-determined etch depth is thought to be due both to degassing of the sample and to edge effects, i.e. preferential etching of the edge of the sample.

Clearly, the polymers show little resistance to the simulated atomic oxygen environment.

EXAMPLE 3

Samples of a polymer composite of Victrex PEEK and carbon fibres available from ICI under the trade name APC-2 were subjected to the simulated atomic oxygen environment described in Example 1 following degassing for 1 hour. The samples tested were approximately 3 mm thick and had a surface area of about 10$^{-5}$m$^2$. The samples were coated with lamellae of vermiculite slurry GP-903, available from W. R. Grace & Co., USA (using a 6.5% by weight slurry which included about 20% by weight of maleinised polybutadiene as a binder), and a synthetic hectorite available from Laporte Industries Limited under the trade name Laponite B (using a 2% by weight slurry). The 0.3 μm vermiculite coating was achieved using a number 2 Meyer bar and the Laponite B and the thicker vermiculite coatings were achieved using a number 4 Meyer bar. For comparison, virgin APC-2 composite material and APC-2 composite material having an aluminium coating deposited thereon by electron beam evaporation were also subjected to the simulated atomic oxygen environment described in Example 1. The results are summarised in Table 2.

TABLE 2

| SAMPLE | COATING THICKNESS (μm) | MASS LOSS (μg/cm²) | | |
|---|---|---|---|---|
| | | AFTER DEGASS | AFTER ETCH | AFTER 14 DAYS |
| APC-2 | — | — | 927 | — |
| APC-2/ Aluminium | — | — | 11.1 | — |
| APC-2/ Laponite B | 0.3 | 0.0 | 80.75 | 70.90 |
| APC-2/ Vermiculite | 0.3 | 21.70 | 25.64 | 6.58 |
| APC-2/ Vermiculite | 0.9 | 7.20 | 17.02 | +8.51 |

EXAMPLE 4

Samples of APC-2 were coated with lamellae of vermiculite and Laponite B slurries as described in Example 3. Meyer bars numbers 2 and 4 were used for the vermiculite and the Laponite B, respectively. For the vermiculite coating, the slurry contained 6.5% by weight of the lamellae and varying amounts of the polymeric binders maleinised polybutadiene (MPBD) or melamine formaldehyde resin (MF). One sample (marked * in Table 3 below) was pre-coated with a polymeric anchor coat of a styrene/2-ethyl hexyl acrylate/methacrylic acid/N-butoxymethyl acrylamide copolymer of the type described in the aforementioned GB-A-1174328 and GB-A-1134876. The coating was applied using a number 1 Meyer bar as a 3% by weight solution in isopropyl alcohol and containing sulphuric acid as catalyst and dried in air at ambient temperature to give a dry coating of thickness 0.12 μm.

The coated samples were then subjected to an adhesion test. The samples were cross-scored on their coated side to give a plurality of rectangles of substantially equal area. An adhesive tape was then applied to the scored coating and the area of coating remaining adhered to the substrate was determined and is quoted as a percentage in Table 3 below.

The results are summarised in Table 3.

TABLE 3

| MINERAL | BINDER (% BY WEIGHT) | ADHESION (%) |
|---|---|---|
| VERMICULITE | MPBD (5) | 10 |
| VERMICULITE | MF (5) | 20 |
| VERMICULITE | MF (20) | 70 |
| VERMICULITE | MPBD (20) | 75 |
| VERMICULITE* | MPBD (20) | 95 |
| LAPONITE B | — | 95 |

EXAMPLE 5

A sample was made similar to that marked * in Table 3 above and it was subjected to thermal cycling from liquid nitrogen temperature to 90° C. The adhesion of the vermiculite coating to the APC-2 substrate appeared to improve.

EXAMPLE 6

Using the procedure described in Example 3, samples of ICI development composites designated APC (HTA) (the polymeric matrix being a polyethersulphone and APC (ITX) (the polymeric matrix being a polyetherketone). The samples were coated with lamellae of vermiculite slurries GP-903 using a 6.5% by weight slurry which included about 20% by weight of MPBD as binder and with Laponite B using a 2% by weight slurry. The 0.3 μm vermiculite coating was achieved using a number 2 Meyer bar and the Laponite B and the thicker vermiculite coatings were achieved using a number 4 Meyer bar. The results are summarised in Table 4.

TABLE 4

| SAMPLE | COATING THICKNESS (μm) | MASS LOSS (μg/cm²) | | |
|---|---|---|---|---|
| | | AFTER DEGASS | AFTER ETCH | AFTER 14 DAYS |
| APC (HTA)/ Laponite B | 0.3 | 50.80 | 81.2 | 0.00 |
| APC (HTA)/ Vermiculite | 0.3 | 24.60 | 83.6 | 0.00 |
| APC (HTA)/ Vermiculite | 0.9 | 35.30 | 64.8 | 4.92 |
| APC (ITX)/ Vermiculite | 0.3 | 12.10 | 22.1 | 0.00 |
| APC (ITX)/ Vermiculite | 0.9 | 35.20 | 27.12 | 11.10 |

EXAMPLE 7

The procedure of Example 6 was repeated for further samples and the coatings and results are summarised in Table 5. The samples were equilibriated for 14 days before the mass loss figures were determined. Vermiculite slurry GP-923 is also available from W. R. Grace & Co. Sumecton (trade name) is a synthetic hectorite available from Kunimine Industries, Japan.

Comparative examples using bentonite (ex Steetley Plc) and ball clay (ex ECC International) are also included in Table 5.

EXAMPLE 8

A 1-2 μm layer of Laponite S lamellae was formed on a silica substrate and the absorbance of radiation in the visible and UV regions was determined for it. The sample has a low absorbance, i.e. it was substantially transparent to the radiation, in both the visible and UV regions.

The procedure was repeated using vermiculite GP-963 (0.1 μm) and the sample had a low absorbance in the visible region.

Similar samples were made up on glass microscope slides and were subjected to the reactor environment as described in Example 1. No change in the absorbance of those samples in the visible region as a result of the treatment was observed, the UV region absorbance not being assessable owing to the use of the glass substrate.

EXAMPLE 9

Substrates, precoated with an anchor coat as described in Example 4, were coated with bentonite which was applied as 7.5% by weight aqueoue slurry which included 35% by weight of MF as binder using Meyer bars numbers 2 and 6 to achieve dry coating thicknesses of 0.3 μm and 1.7 μm, respectively. Both samples were degassed for 1 hour and subjected to the simulated atomic oxygen environment described in Example 1. Even without equilibration, both samples exhibited good barrier properties, i.e. <100 μg/cm² weight loss.

TABLE 5

| SUBSTRATE | MINERAL | SLURRY (% BY WEIGHT) | BINDER (% BY WEIGHT) | ANCHOR COAT (% BY WEIGHT) | MEYER BAR NO | THICKNESS μm | MASS LOSS μg/cm² |
|---|---|---|---|---|---|---|---|
| APC-2 | Vermiculite GP-903 | 1 | MPBD (20) | YES | 1 | 0.025 | 30 |
| APC-2 | Vermiculite GP-903 | 2 | MPBD (5) | YES | 2 | 0.1 | 2 |
| APC-2 | Vermiculite GP-903 | 2 | MF (5) | YES | 2 | 0.1 | 86 |
| APC-2 | Vermiculite GP-903 | 2 | MPBD (5) | — | 2 | 0.1 | 137 |
| APC-2 | Vermiculite GP-923 | 6.5 | — | YES | 4 | 0.9 | 124 |
| APC-2 | Vermiculite GP-923 | 2 | — | YES | 2 | 0.1 | 96 |
| APC-2 | Vermiculite GP-923 | 2 | MPBD (5) | — | 2 | 0.1 | 108 |
| APC-2 | Vermiculite GP-923 | 2 | — | — | 2 | 0.1 | 137 |
| APC-2 | Vermiculite GP-923 | 2 | MPBD (5) | YES | 2 | 0.1 | 99 |
| APC-2 | Laponite B | 1 | — | — | 1 | 0.025 | 50 |
| APC (HTA) | Laponite B | 2 | — | — | 4 | 0.3 | 30 |
| APC (ITX) | Laponite B | 2 | — | — | 4 | 0.3 | 0 |
| APC-2 | Sumecton | 2 | — | — | 2 | 0.1 | 110 |
| APC-2 | Bentonite | 2 | — | — | 2 | 0.1 | 282 |
| APC-2 | Bentonite | 2 | — | — | 2 | 0.1 | 243 |
| APC-2 | Bentonite | 2 | — | — | 4 | 0.3 | 301 |
| APC-2 | Bentonite | 2 | MPBD (5) | — | 2 | 0.1 | 239 |
| APC-2 | Ball clay | 2 | — | — | 2 | 0.1 | 491 |
| APC-2 | Ball clay | 2 | MPBD (5) | — | 2 | 0.1 | 297 |

We claim:

1. An aerospace vehicle comprising external surfaces susceptible to atomic oxygen attack which have a protective barrier against such attack, said barrier comprising a substantially continuous layer of lamellae of a film-forming, 2:1 phyllosilicate layer mineral which exhibits barrier properties against atomic oxygen.

2. A vehicle as defined in claim 1, wherein the layer mineral is selected from the group consisting of smectites and vermiculite.

3. A vehicle as defined in claim 1 wherein said barrier comprises a substantially continuous layer of lamellae at least 0.1 μm thick.

4. A vehicle as defined in claim 1 wherein said barrier comprises (1) a substantially continuous layer containing vermiculite lamellae and (2) at least one component selected from the group consisting of (i) a polymeric binder in said layer and (ii) a polymer anchor coating on said layer, said anchor coating being interposed between said substantially continuous layer and said external surfaces.

5. A vehicle as defined in claim 4 wherein the polymeric binder comprises a functionalised polyolefin and a liquid formaldehyde resin.

6. A vehicle as defined in claim 4 wherein the binder comprises at least 5% by weight of said substantially continuous layer.

7. A vehicle as defined in claim 4 wherein the polymeric anchor coating comprises a styrene/acrylamide copolymer.

8. A vehicle as defined in claim 4 wherein the anchor coating is less than 1 μm thick.

9. A vehicle as defined in claim 1 wherein the protective barrier is formed by applying the lamellae as an aqueous dispersion and removing the water to form a coherent layer.

10. A vehicle as defined in claim 9 wherein the dispersion comprises between 0.5% and 20% by weight of lamellae.

11. A vehicle as defined in claim 2, wherein the smectites are hectorite or montmorillonite.

12. A vehicle as defined in claim 3, wherein said layer of lamellae is at least 0.3 μm thick.

13. A vehicle as defined in claim 12, wherein said layer of lamellae is between 0.3 μm and 1 μm thick.

14. A vehicle as defined in claim 5, wherein said polyolefin is maleinised polybutadiene.

15. A vehicle as defined in claim 5, wherein said formaldehyde resin is urea formaldehyde, melamine formaldehyde, phenol formaldehyde, resorcinol formaldehyde, cresol formaldehyde or mixtures thereof.

16. A vehicle as defined in claim 15, wherein said formaldehyde resin is melamine formaldehyde.

17. A vehicle as defined in claim 6, wherein said binder comprises between 10% and 30% by weight of said substantially continuous layer.

18. A vehicle as defined in claim 17, wherein said binder comprises between 15% and 25% by weight of said substantially continuous layer.

19. A vehicle as defined in claim 7, wherein said styrene/acrylamide copolymer is a styrene/2-ethyl hexyl acrylate/methacrylate acid/ N-butoxymethyl acrylamide copolymer.

20. A vehicle as defined in claim 8, wherein said anchor coating is less than 0.5 μm thick.

21. A vehicle as defined in claim 20, wherein said anchor coating is less than 0.25 μ thick.

22. A vehicle as defined in claim 10, wherein said dispersion comprises between 1% and 10% by weight of lamellae.

23. An aerospace vehicle component comprising external surfaces susceptible to atomic oxygen attack which have a protective barrier against such attack, said barrier comprising a substantially continuous layer of lamellae of a film-forming, 2:1 phyllosilicate layer mineral which exhibits barrier properties against atomic oxygen.

24. A protective barrier on a substrate for protecting a surface thereof against atomic oxygen attack, said barrier comprising a substantially continuous layer of vermiculite lamellae in a polymeric binder, said binder comprising a functionalised polyolefin and a liquid formaldehyde resin.

25. A protective barrier according to claim 24, wherein the polyolefin is maleinised polybutadiene.

26. A protective barrier according to claim 24, wherein said formaldehyde resin is urea formaldehyde, melamine formaldehyde, phenol formaldehyde, resorcinol formaldehyde, cresol formaldehyde or mixtures thereof.

27. A protective barrier on a barrier, for protecting a surface thereof against atomic oxygen attack, said barrier comprising (1) a substantially continuous layer of vermiculite lamellae and (2) a polymer anchor coating, said component (2) being positioned on said substantially continuous layer (1) and comprising a styrene/acrylamide copolymer.

28. A protective barrier according to claim 27, wherein said styrene/acrylamide copolymer is a styrene/2-ethyl hexyl acrylate/methacrylic acid/N-butoxymethyl acrylamide copolymer.

29. A protective barrier according to claim 24, wherein the polymeric anchor coating is less than 1 $\mu$m thick.

* * * * *